United States Patent [19]
Ishimoto et al.

[11] Patent Number: 6,031,885
[45] Date of Patent: Feb. 29, 2000

[54] DISPLACEMENT DETECTING APPARATUS

[75] Inventors: Shigeru Ishimoto; Toyohiko Matsuda, both of Yokohama, Japan

[73] Assignee: Sony Precision Technology Inc., Tokyo, Japan

[21] Appl. No.: 08/922,525

[22] Filed: Sep. 3, 1997

[30] Foreign Application Priority Data

Sep. 3, 1996 [JP] Japan .................................. 8-233458

[51] Int. Cl.[7] .............................. H04L 7/00; H04L 25/36; H04L 25/40
[52] U.S. Cl. ...................... 375/371; 375/324; 364/724.1
[58] Field of Search ................... 375/326, 324, 375/355, 371, 374; 364/724.1

[56] References Cited

U.S. PATENT DOCUMENTS

| 5,299,143 | 3/1994 | Hellinga et al. | 364/561 |
|---|---|---|---|
| 5,309,484 | 5/1994 | McLane et al. | 375/354 |
| 5,339,030 | 8/1994 | Hayashi | 324/207.23 |
| 5,365,468 | 11/1994 | Kakubo et al. | 364/724.1 |
| 5,511,091 | 4/1996 | Saito | 375/371 |
| 5,515,403 | 5/1996 | Sloan et al. | 375/371 |
| 5,535,252 | 7/1996 | Kobayashi | 375/371 |

*Primary Examiner*—Chi H. Pham
*Assistant Examiner*—Bryan Webster
*Attorney, Agent, or Firm*—Foley & Lardner

[57] ABSTRACT

A displacement detecting apparatus outputs a displacement information signal obtained by interpolating a phase modulation. A direction block obtains a direction signal indicative whether the cycle of the phase modulation signal is longer than the cycle of the reference signal. A phase difference block obtains the number of the interpolation clock pulses which number corresponds to a phase difference between the phase modulation signal and the reference signal. An up/down counter counts to an interpolation number upon receiving the direction signal and a pulse train corresponding to the phase difference. The presetting block presets the number of pulses corresponding to the phase difference in the up/down counter. The displacement information block outputs a Glay code converted from continuous 2 bits of the count value of the up/down counter as displacement information.

14 Claims, 8 Drawing Sheets

| | | | | | | | | | | | | |
|---|---|---|---|---|---|---|---|---|---|---|---|---|
| FIG. 5A UP/DOWN | | | | | | 400 NUMBER SYSTEM CORRECTION 624 | | | | | | |
| FIG. 5B CLOCK | | | | | | | | | | | | |
| FIG. 5C OUT | 397 | 398 | 399 | 0 | 1 | 2 | 1 | 0 | 399 | 398 | 397 | 396 |
| FIG. 5D F OF ADDER | 1021 | 1022 | 1023 | 624 | 625 | 626 | 2 | | | | | |
| FIG. 5E | 1022 | 1023 | 0 | 625 | 626 | 627 | 1 | 0 | 1023 | 398 | 397 | 396 | 395 |
| FIG. 5F CARRY BORROW | | | | | | | | | | | | |
| FIG. 5G F OF SUBTRACTER | 398 | 397 | 0 | 1 | 2 | 3 | 1 | 0 | 399 | 398 | 397 | 396 | 395 |
| FIG. 5H OUT | 397 | 398 | 399 | 0 | 1 | 2 | 1 | 0 | 399 | 398 | 397 | 396 |

DISPLACEMENT DETECTING APPARATUS

BACKGROUND OF THE INVENTION

The present invention relates to improvements in a displacement detecting apparatus.

Figure 6:
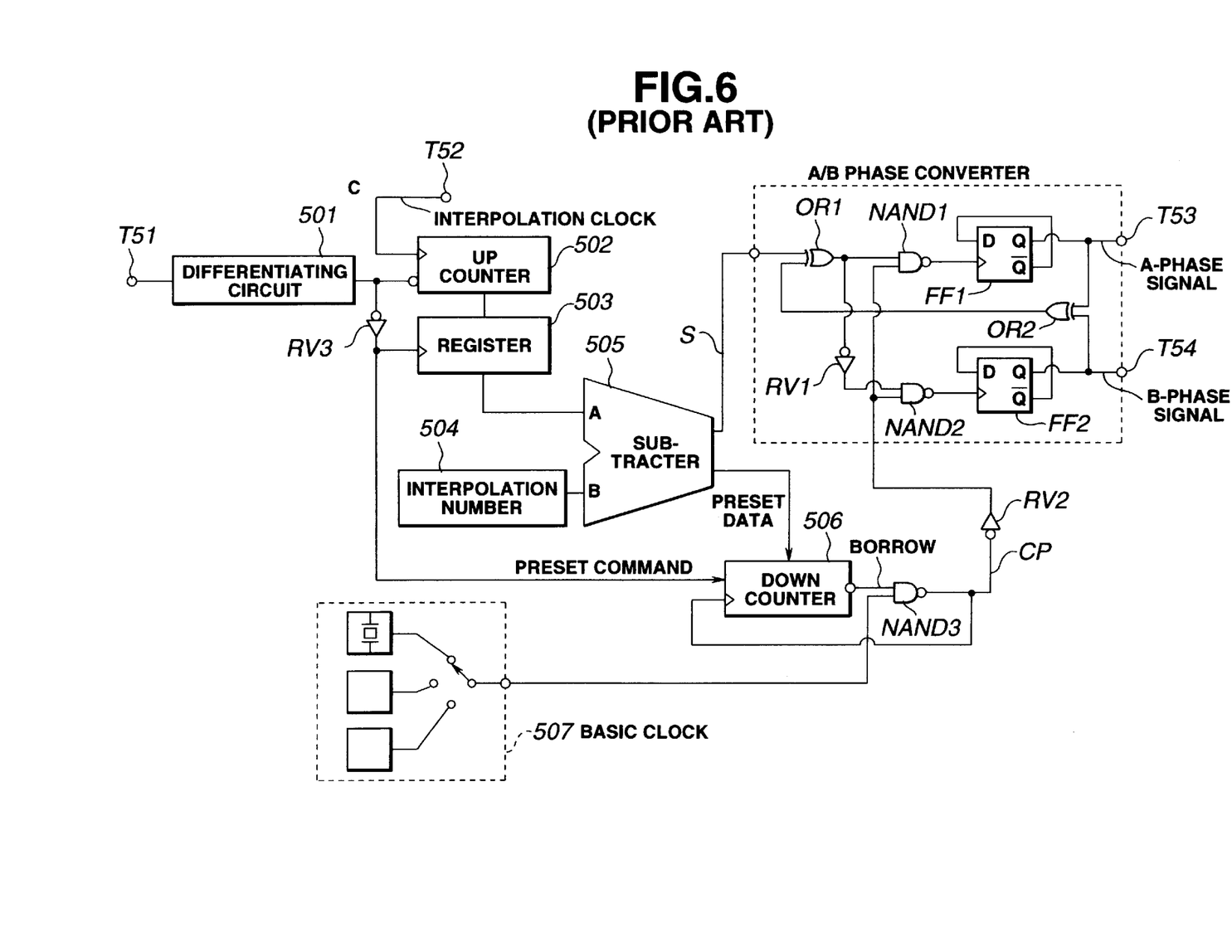
FIG. 6 is a system block view which shows a conventional displacement detecting apparatus.

Conventionally, a typical displacement detecting apparatus of an electromagnetic modulation type has obtained a displacement by converting two parallel modulation signals indicative of a detection result into a phase modulation signal and by comparing the cycle of the phase modulation signal with the cycle of a reference signal. In order to improve the detection accuracy of the detected displacement, an interpolation has been executed as explained hereinafter with reference to FIGS. 6 and 7. In FIG. 6, the phase modulation signal is inputted to an input terminal T51 and is differentiated at a differentiating circuit 501. The differentiating circuit 501 outputs a pulse at an end of a fall of the phase modulation signal and applies it to a clear terminal of an up counter 502 and a reverse circuit RV3. The reversed signal from the reverse circuit RV3 is applied to a register 503 and a preset command input port of a down counter 506. After the up counter 502 is cleared by receiving the pulse from the differentiating circuit 501, the up counter 502 calculates an interpolation clock supplied from a terminal T52 and incrementally counts until again cleared. The register 503 latches the count value of the up counter 502 when the register 503 receives the reverse signal of the pulse from the differentiating circuit 501 reversed at the reverse circuit RV3. Accordingly, the count value is a value obtained by dividing the cycle of the phase modulation signal with the cycle of the interpolation clock. In other words, it is a pulse number of the interpolation clock corresponding to the length of the cycle of the phase modulation signal. The interpolation number to be applied to the system is set at an interpolation number setting device 504. In this case, a value obtained by dividing the cycle of the reference signal with the cycle of the interpolation clock is used as the interpolation number. For example, a value 200 is obtained by dividing the cycle 20 μsec of the reference signal with the cycle 0.1 μsec of the interpolation clock and is used as the interpolation number. A signed subtracter 505 receives a signal A which is obtained by dividing the cycle of the phase modulation signal with the cycle of the interpolation clock such as 220=22 μsec÷0.1 μsec and a signal B which is obtained by dividing the cycle of the reference signal with the cycle of the interpolation clock such as 200. The signed subtracter 505 obtains a direction signal S indicating a direction of the displacement and a displacement signal (|A−B|, herein 20=220−200) by subtracting the signal B from the signal A.

The displacement signal represents the displacement by means of a pulse number of the interpolation clock. The pulse number indicative of the displacement is used as preset data of a down counter 506. The down counter 506 is provided with an input terminal for receiving the preset command, an input terminal for receiving the preset data, an input terminal for receiving the clock signal and an output terminal for outputting a borrow signal.

Figure 7:
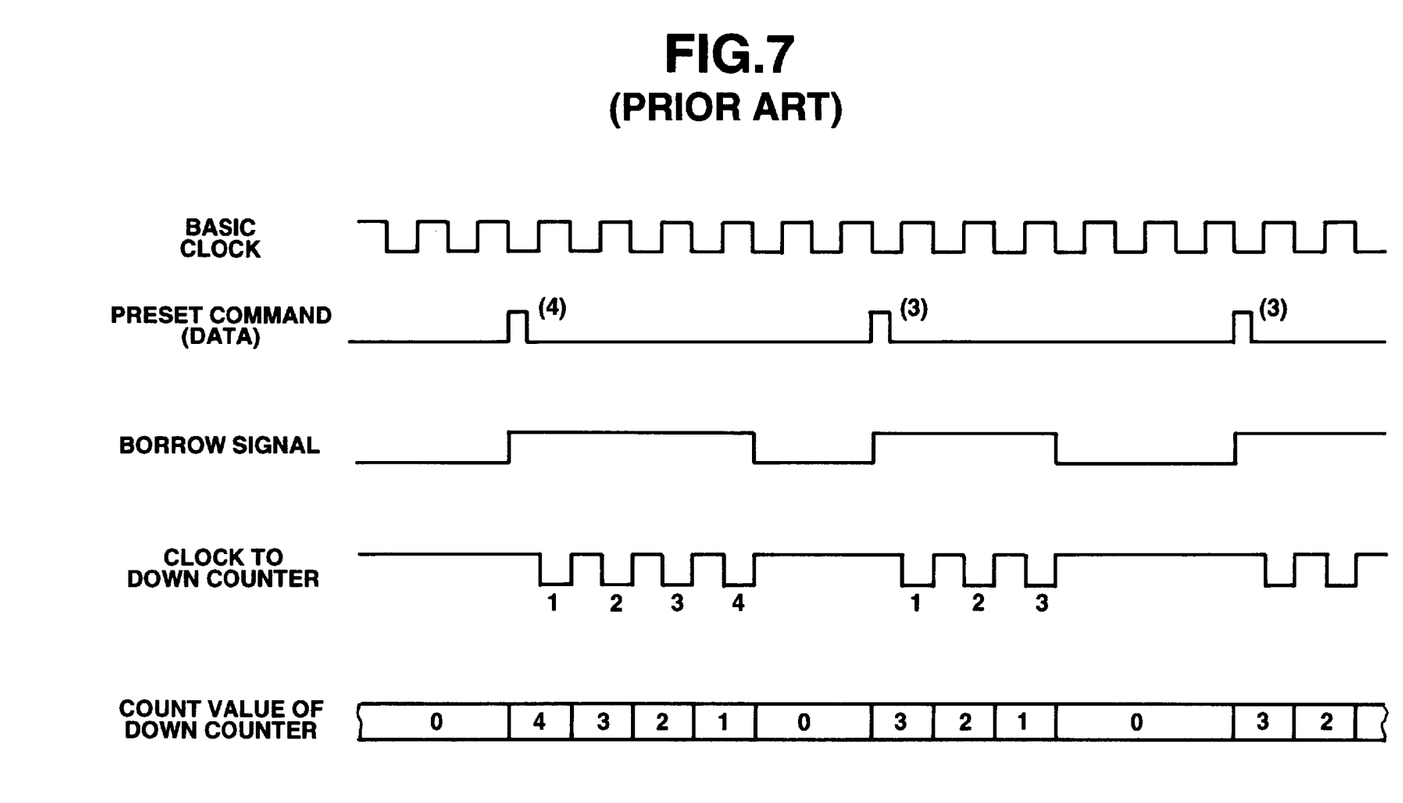
FIG. 7 is time charts for explaining the operation of the apparatus shown in FIG. 6.
Figure 8:
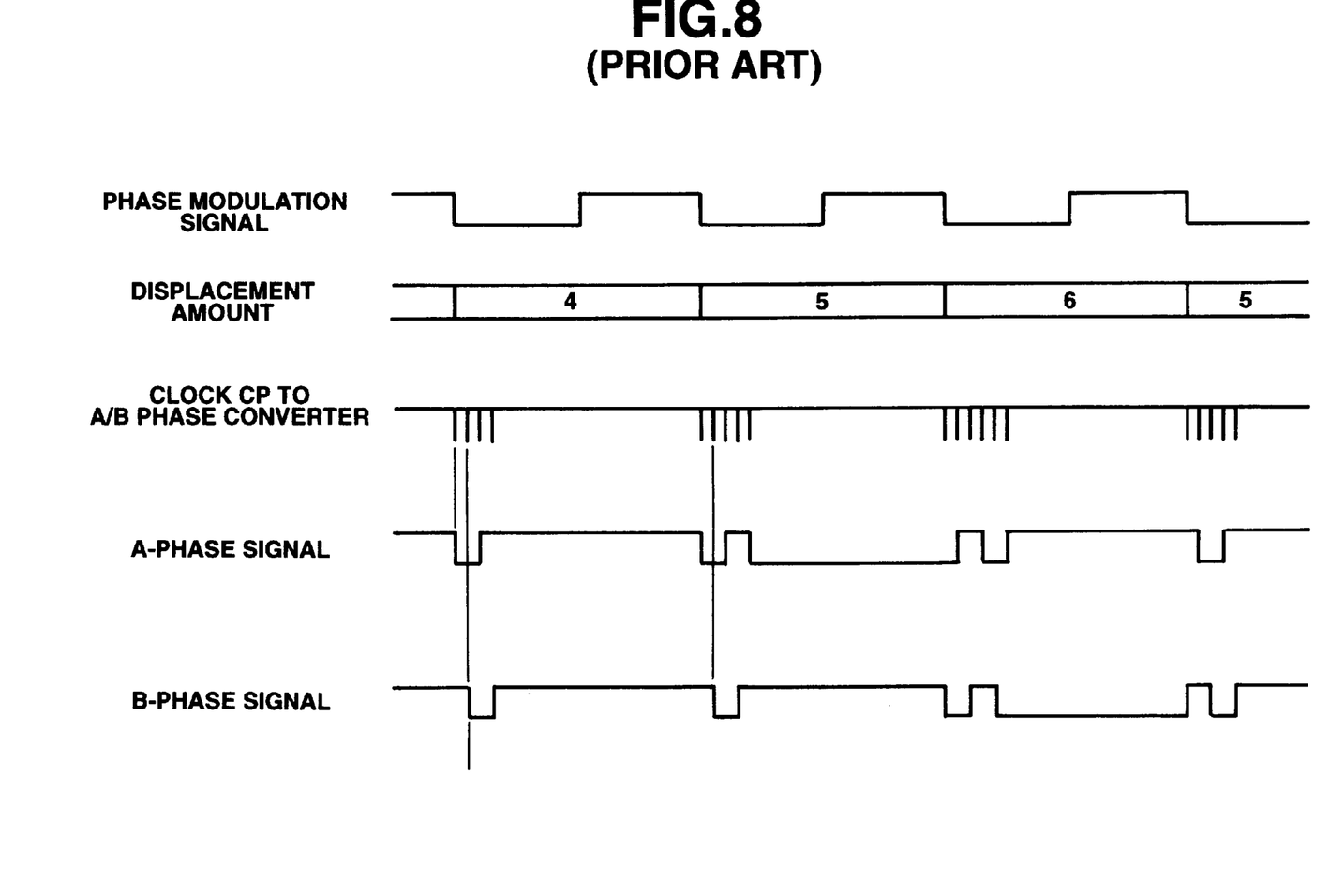
FIG. 8 is time charts for explaining the operation of the apparatus shown in FIG. 6.

When the signal from the reverse circuit RV3 is applied to the preset command terminal of the down counter 506, the down counter 506 sets the displacement signal |A−B| applied from the signed subtracter 505 as a count value and outputs the borrow signal. The borrow signal is applied to an input port of a gate circuit NAND3 to control the passing of the clock signal applied to the other port of the gate circuit NAND3. The operation of the down counter 506 will be briefly discussed with reference to FIG. 7. It is assumed that the preset data is 4, 3 and 3 as shown in FIG. 7. The signal obtained by differentiating the phase modulation signal inputted to the terminal T51 at the differentiating circuit 501 and by reversing the differentiated signal at the reverse circuit RV3 represents the fall point of the phase modulation signal. The point represents an end of a cycle of the phase modulation signal and a start of the next cycle. That is, the preset command at the down counter 506 represents a start of each cycle. When the down counter 506 receives the preset command, it presets the preset data therein and turns the borrow signal ON, as shown by FIG. 7. When the borrow signal is turned ON, the gate circuit NAND3 is opened to output the basic clock signal to A/B phase converter and to the down counter 506. Upon receipt of the clock signal, the down counter 506 starts the count down of the count value (herein, 4), as shown in FIG. 7. When the preset data is 4, the pulse number of the basic clock passing through the gate circuit NAND3 is four. Therefore, the down counter 506 counts four pulses, and the content of the counter is changed to 4, 3, 2, 1, and 0. When the count value of the counter 506 reaches zero, the borrow signal is turned OFF, and the output of the pulse is stopped by closing the gate circuit NAND3. When the next displacement signal (preset data, 3) is set at the down counter 506, again similar operation is repeated. In the above-mentioned operation, although the magnitude of the displacement is represented by the number of the pulses, the down counter 506 operates synchronously with the basic clock. Therefore, the clock sent to the A/B phase converter through the gate circuit NAND3 has the cycle of the basic clock, and has the number of pulses as the number of pulses of the interpolation clock corresponding to the displacement. The later A/B phase converter is constituted by a first flip-flop FF1, a second flip-flop FF2, a first gate circuit NAND1, a second gate circuit NAND2, a first OR circuit OR1, a second OR circuit OR2 and a reverse circuit RV1. The direction signal S from the subtracter 505 is inputted to one input port of the first OR circuit OR1. The output of the first OR circuit OR1 is inputted to an input port of the gate circuit NAND1 and is reversed at the reverse circuit RV1. The reversed signal is inputted to an input port of the second gate circuit NAND2. The clock pulse passed through the gate circuit NAND3 is inputted to another input port of each of the first and second gate circuit NAND1 and NAND2. Therefore, the clock pulse is inputted through an opened gate according to the polarity of the direction signal to the corresponding flip-flop FF1 or FF2 to reverse its condition. The outputs of the first and second flip-flops FF1 and FF2 are supplied to the terminals T53 and T54 as the A-phase signal and the B-phase signal, respectively. The output of the flip-flop FF1, FF2 is applied to an input port of the second OR circuit OR2, and the output of the second OR circuit OR is applied to the other input port of the first OR circuit OR1. Therefore, the clock pulse supplied from the gate circuit NAND3 through the reverse circuit RV2 to the A/B converter passes the first and second gate circuits NAND1 and NAND2 alternatively, and reversed A-phase signal and B-phase signal are alternatively outputted to the output terminals T53 and T54, as shown in FIG. 8. In case that the displacement is 4 as shown at the left side hand of FIG. 8, the first flip-flop FF1 is reversed by the first pulse, and the A-phase signal becomes L (low level). The second flip-flop FF2 is reversed by the second pulse, and the B-phase signal becomes L. Further, the first flip-flop FF1 is again reversed by the third pulse, and the A-phase signal becomes H (high level). The second flip-flop FF2 is again reversed by the final fourth pulse, and the B-phase signal becomes H. Thereafter, the A-phase and B-phase signals are not changed until the next cycle.

However, the method does not have a part for making clear a positional relation between the origin point and A/B phase or ABS value of the cyclic displacement information within one cycle obtained by the displacement sensor. Therefore, when the electric source is turned on, the condition of the A/B phase signal (2 bit Glay code) is unstable (does not become constant). This is not sufficient to respond to the today's demand that it is preferable to synchronize the origin signal with the A/B phase signal.

SUMMARY OF THE INVENTION

It is an object of the present invention to provide an improved displacement detecting apparatus which sufficiently meets the above-mentioned demand.

A displacement detecting apparatus according to the present invention interpolates a phase modulation signal whose phase difference with a reference signal represents a displacement and outputs the interpolated phase modulation signal. The displacement detecting apparatus comprises a direction obtaining means, a phase difference obtaining means, a pulse train generating means, an up/down counter, a presetting means and a displacement information outputting means. The direction obtaining means obtains a direction signal indicative whether a cycle of the phase modulation signal is longer than a cycle of the reference signal. The direction obtaining means obtains a cycle difference between the cycle of the phase modulation signal and the cycle of the reference signal which is the same as that of the phase modulation signal under zero-displacement condition. The direction obtaining means obtains the number of pulses of an interpolation clock which number corresponds to the cycle difference. The phase difference obtaining means obtains a phase difference between the phase modulation signal and the reference signal. The phase difference obtaining means obtains the number of pulses of the interpolation clock which number corresponds to the phase difference. The pulse train generating means generates a pulse train constituted by pulses whose number is as same as the number of pulses of the interpolation clock indicative of the phase difference. The up/down counter receives the pulse train from the pulse train generating means and the direction signal from the direction obtaining means and counting to an interpolation number. The presetting means presets the number of pulses obtained by the phase difference obtaining means in the up/down counter. The displacement information outputting means outputs a Glay code converted from continuous 2 bits of the count value of the up/down counter as displacement information.

DETAILED DESCRIPTION OF THE INVENTION

Referring to FIGS. 1 to 5, there is shown an embodiment of a displacement detecting apparatus according to the present invention.

Figure 1:
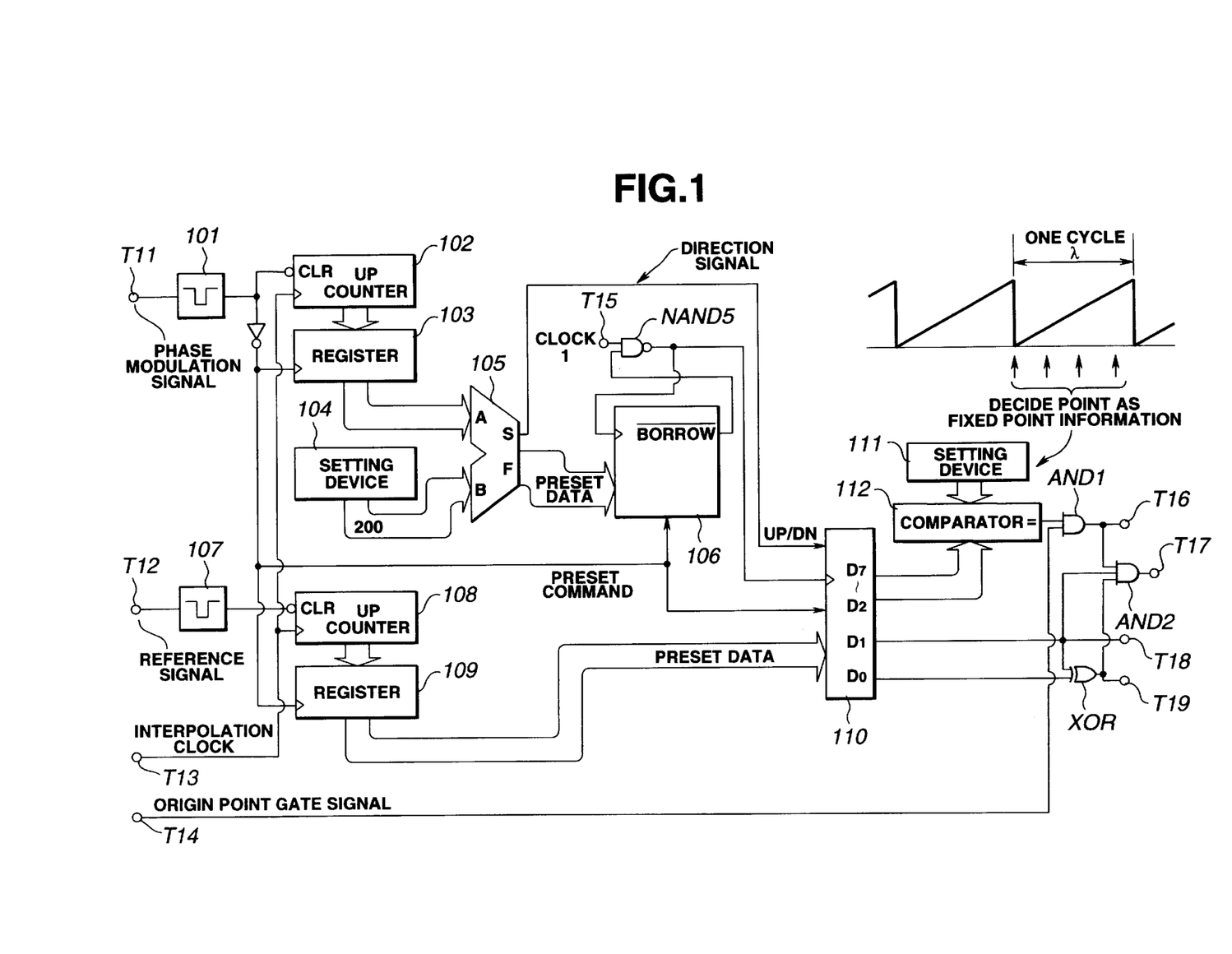
FIG. 1 is a block diagram which shows an essential part of a displacement detecting apparatus of an embodiment according to the present invention.

FIG. 1 shows a fundamental construction of the displacement detecting apparatus according to the present invention. In this apparatus, a reference signal is 50 kHz, and a partition number is 200. An interpolation clock frequency is 10 MHz=50 kHz×200. The offset by 360 degree between two signal phases corresponds to a change for one cycle $\lambda$ of displacement information obtained by the displacement sensor.

In the displacement detecting apparatus shown in FIG. 1, a differentiating circuit 107, an up counter 108 and a register 109 constitute a circuit for obtaining a multiplier factor of an interpolation clock cycle by comparing a reference signal and a phase modulation signal and by obtaining a difference therebetween. The differentiating circuit 107 detects the fall of the reference signal and inputs it to the clear terminal CLR of the up counter 108. The clock supplied to the up counter 108 is an interpolation clock which is the same as a clock supplied to an up counter 102 mentioned later. The up counter 108 is cleared by the fall of the reference signal and newly starts the counting. That is, the up counter 108 repeats the counting and the clear thereof in reply to the fall of the reference signal. Accordingly, the count value of the up counter 108 is changed within a range 0 to 199.

Figures 2A, 2B, 2C:
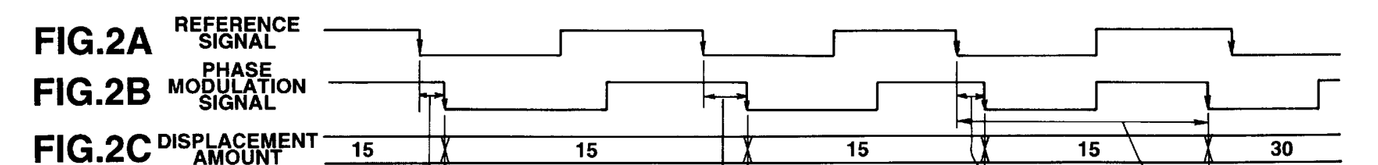
FIGS. 2A to 2H are time charts for explaining the operation of the displacement detecting apparatus of FIG. 1.
Figures 2D, 2E:
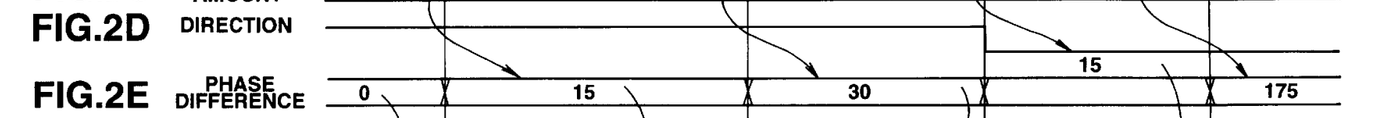

During the counting of the up counter 108, if the phase modulation signal is fallen, the count value of the up counter 108 is latched at the register 109. As shown in FIGS. 2A, 2B and 2E, if the delay of the phase of the phase modulation signal is accumulated, a period from the fall of the reference signal to the fall of the phase modulation signal is increased. If the phase of the phase modulation signal is advanced, the period is decreased. Therefore, the period is ABS value of cyclic displacement information of a displacement sensor in one cycle by each phase modulation signal cycle. The content of the register 109 is sent to an up/down counter 110 and is preset in the up/down counter 110. The value is a displacement as to one cycle of the phase modulation signal, as shown in FIG. 2E.

FIG. 2E shows a phase difference between the reference signal and the phase modulation signal.

As shown by the arrow of FIG. 2E, when the phase difference is 15 first, the value 15 is preset in an up/down counter 110 in the next cycle. When a phase difference in the next cycle becomes 15 and the total phase difference becomes 30, 30 is preset in the up/down counter 110. When the fall of the phase modulation signal is earlier than the fall of the reference signal as shown in the four cycle of FIG. 2E, the up counter 108 counts to the interpolation number of the reference signal. Then, the count value is returned to zero, and the up counter 108 executes the counting until the phase modulation signal is next fallen. Accordingly, the counting by the up counter 108 is executed from one prior to the falling point of the reference signal.

The phase modulation signal is inputted to a terminal T11, and a differentiating circuit 101 differentiates the fall of the phase modulation signal. The output of the differentiating circuit 101 is applied to a clear terminal CLR of the up counter 102 so as to reset the up counter 102 to zero by each fall of the phase modulation signal. Simultaneously, the count value of the up counter 102 at the time just before the up counter 102 is reset to zero is latched in the register 103. Therefore, the reverse signal of the differentiated phase modulation signal is inputted to the register 103 as a latch clock. Since the up counter 102 counts the interpolation clock through one cycle of the phase modulation signal, a time period of one cycle of the phase modulation signal is stored in the register 103 as a multiplier. In other words, the number of the pulses of the interpolation clock converted from the length of the one cycle of the phase modulation signal is stored in the register 103.

On the other hand, the cycle of the reference signal is stored as a multiplier of the interpolation clock cycle in a setting device 104. In other words, the number of the pulses of the interpolation clock converted from the cycle of the reference signal is stored in the setting device 104. Herein, the interpolation number is 200.

Two values of the phase modulation signal cycle converted into the number of the pulses of the interpolation clock and the reference signal cycle converted into the number of the pulses of the interpolation clock are inputted to a signed subtracter 105. Therefore, the signed subtracter 105 outputs an absolute value of the difference between the two values and a sign indicative of a direction of the subtraction thereby. When the count value stored in the register 103 is greater than the set value set in the setting device 104, that is, when the cycle of the phase modulation signal is longer than the cycle of the reference signal, the sign becomes a logic "1". The absolute value of the difference is preset in the down counter 106 in order to convert the absolute value into a corresponding pulse train. This preset operation is executed according to the fall of the phase modulation signal.

There have been proposed and in practical use various method for converting the cycle of the phase modulation signal into a pulse train upon comparing it with the cycle of the reference signal. The interpolation clock is arranged so as to be changed according to the partition number.

The operation of the circuit of FIG. 1 will be discussed with reference to FIGS. 2A to 2H. FIG. 2A shows a cycle of the reference signal. FIG. 2B shows the cycle of the phase modulation signal. As shown in FIG. 2B, until the third phase from the left hand side in the Figure, the fall point of the phase modulation signal is delayed to that of the reference signal. Further at the fourth cycle, the fall of the phase modulation signal is advanced as compared with the fall of the reference signal.

FIG. 2C shows a value indicative of the difference between the length of the reference signal cycle and the length of the phase modulation signal cycle.

That is, this figure shows how long the phase modulation signal delays with respect to the one cycle of the reference signal. FIG. 2C shows that the delay is 15. FIG. 2D shows the direction signal indicative of the directivity of the phase modulation signal with respect to the reference signal. Until the third cycle from the left hand side, the phase modulation signal is delayed with respect to the reference signal. Therefore, the direction signal is H (high level). At the fourth cycle the phase modulation signal is advanced with respect to the reference signal. Therefore, herein the direction signal becomes L (low level).

Again, as shown in FIG. 1, a gate circuit NAND5 obtains NAND (negative AND) between the clock input to be supplied to the down counter 106 and a borrow output of the down counter 106. If the down counter 106 is an 8 bit counter, the count value is normally stopped at 00 condition.

When the preset data is set at the down counter 106, the borrow output becomes H (high level). Therefore, the clock is inputted to the down counter 106, and the counting of the down counter 106 is started. When the set data is 15, the count value is gradually decreased from 15 to 0 one by one. If the count value finally becomes zero, the borrow output becomes L (low level), and the input of the clock is stopped. From this time, the pulse train corresponding to the preset value in the cycle of the clock 1 is obtained at an output of the gate circuit NAND5.

Figure 2F:
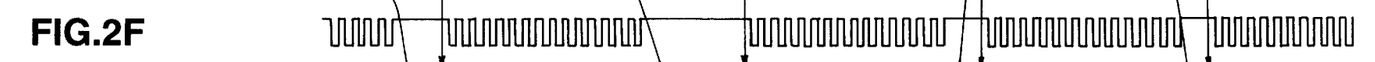

The number of pulses of the obtained pulse train corresponds to the displacement of the displacement sensor interpolated by each phase modulation signal cycle. The pulse train from the gate circuit NAND5 is sent to the up/down counter 101. FIG. 2F shows this pulse train. In addition to the pulse train, the direction signal from the signed subtracter 105 and a preset command signal of the falling point of the phase modulation signal from the differentiating circuit 101 are inputted to the up/down counter 110. The up/down counter 110 sets the phase difference of the cycles before the register 109 sends the signal as the preset data therein when receives the preset command signal. Accordingly, when the electric source of this apparatus is turned on, the correct phase difference is set at the up/down counter 110 on or by a second cycle. The up/down counter 110 executes the up counting when direction signal is H, and executes the down counting when the direction signal is L.

Figure 2G:
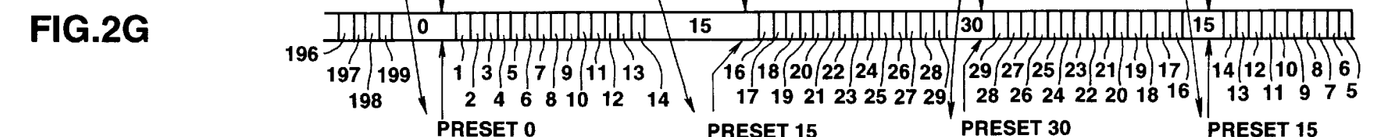

The output of the down counter 106 is the pulse train whose number of pulses is as same as that preset in the down count 105 according to the displacement, as shown in FIG. 2F. When zero has firstly set in the up/down counter 110 as shown in FIG. 2G, the up/down counter 110 counts the fifteen pulses set from the down counter 106 and therefore the count value of the up/down counter 110 is changed from 1 to 15 one by one. 30 When the fifteen pulses are sent from the down counter 106 in the next cycle, the pulses are added to the previous count value and therefore the count value is changed from 16 to 30 one by one. Further, in the next to next cycle, the number of the pulses is fifteen and the direction signal thereof is L. Therefore, the count value is changed from 29 to 15 one by one.

Figure 2H:
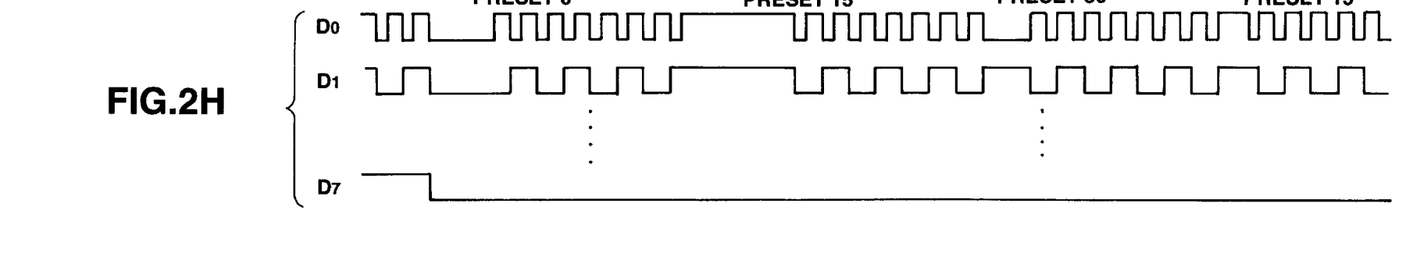
Figure 3A:
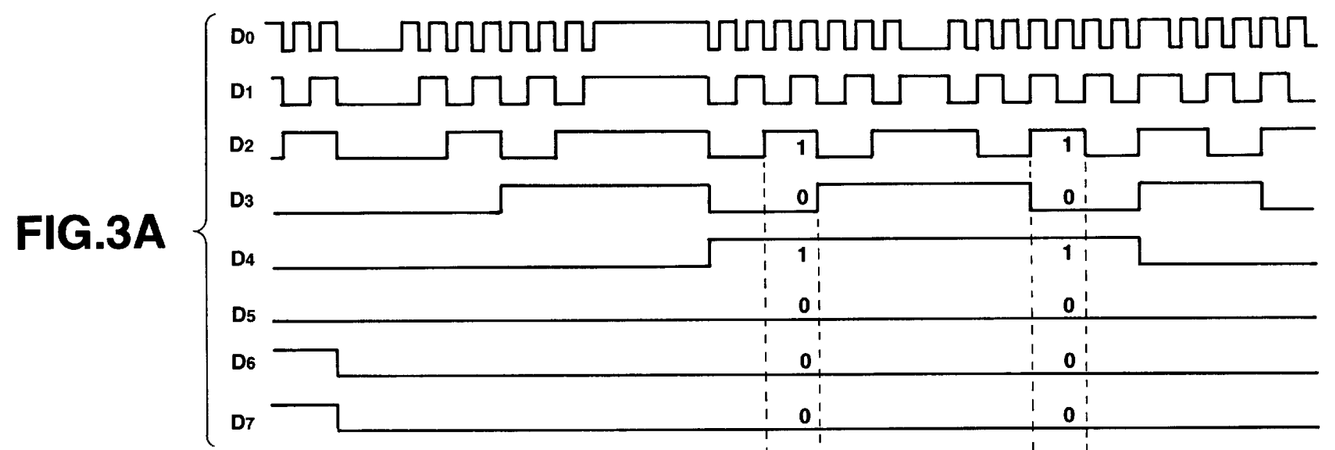
FIGS. 3A to 3E are time charts for explaining the operation of the displacement detecting apparatus of FIG. 1.
Figures 3B, 3C:
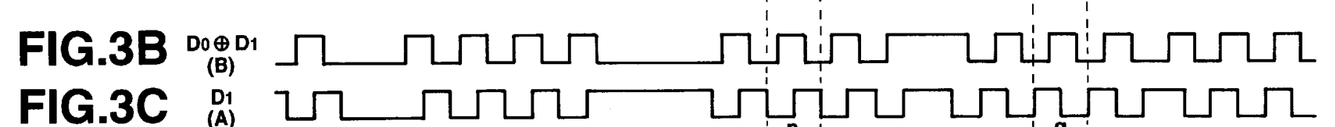
Figure 3D:
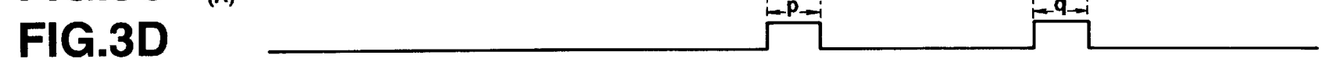
Figure 3E:
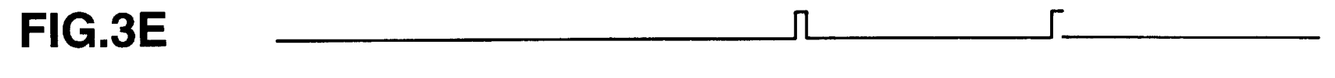

The output of the up/down counter 110 is 8 bit parallel data, as shown by FIG. 2H. The upper 6 bits D2 to D7 of the parallel data are inputted to one of inputs of a comparator 112 and are compared with the setting value inputted to the other input. The setting value set at the setting device 111 is a value for commanding which point in one cycle of the reference signal is set as a fixed point information. For example, in case that the period p shown in FIGS. 3A to 3E is set as a fixed point, the values D2, D3, D4, D5, D6 and D7 takes 1, 0, 1, 0, 0 and 0, respectively. Therefore, 5 of the decimal cord corresponding to 000101 of the binary code is set in the setting device 111.

The period when the value set in the setting device 111 corresponds to the output value of the up/down counter 110 is a period shown by periods p and q in FIGS. 3A to 3E. When the comparator 112 detects that the count value corresponds to the set value, the comparator 112 outputs an output signal. The output signal of the comparator 112 is sent to a gate circuit AND1. When an origin gate input set to the other input of the gate circuit AND1 is ON signal, the output signal of the comparator 112 outputted from the gate circuit NAD1. The output of the gate circuit NAD1 is a signal shown by FIG. 3D. This signal may be used as an origin signal.

The lower 2 bits D0 and D2 of the output of the up/down counter 110 are inputted to two input ports of an exclusive- OR circuit XOR, respectively in order to produce an equality/inequality output as to the 2 bits data D0 and D1. That is to say, when the input to the exclusive-OR circuit XOR is 00 or 11, the output of the exclusive-OR circuit XOR is 0. When the input to the exclusive-OR circuit XOR is 01 or 10, the output of the exclusive-OR circuit XOR is 1. The output D1 of the counter 111 is outputted to a terminal T18 as A-phase signal as it is. The output of the exclusive-OR circuit XOR is outputted to a terminal T19 as B-phase signal. The A-phase signal, the B-phase signal and the equality output of the comparator 112 are inputted to a gate circuit AND2. When these signals are identified, the comparator 112 outputs an output to a terminal T17. The output of the comparator 112 is a signal shown by FIG. 3E and represents the origin position.

In the above-explained apparatus, the up/down counter 110 is a counter which can count to the interpolation number. The counter is basically an interpolation number system counter in which a radix is the interpolation number. In this embodiment, the radix (or base) is 200 and therefore the counter is 200 number system up/down counter. Since it is necessary that the up/down counter 110 changes its number system according to the interpolation number, it is preferable that it is constituted by a programable N-number system up/down counter. An example of the counter which satisfies the demand as mentioned above is shown in FIG. 4. If a binary counter of 10 bits size is used so as to count a maximum number (maximum radix) 1024, a counter of a maximum 1024 number system will be constructed. Therefore, in order to operate the counter as a 400 number system counter (400 is a radix of this 400 number system counter), a correction value 624 obtained by subtracting 400 from 1024 may be set in the counter of 1024 number system.

Figure 4:
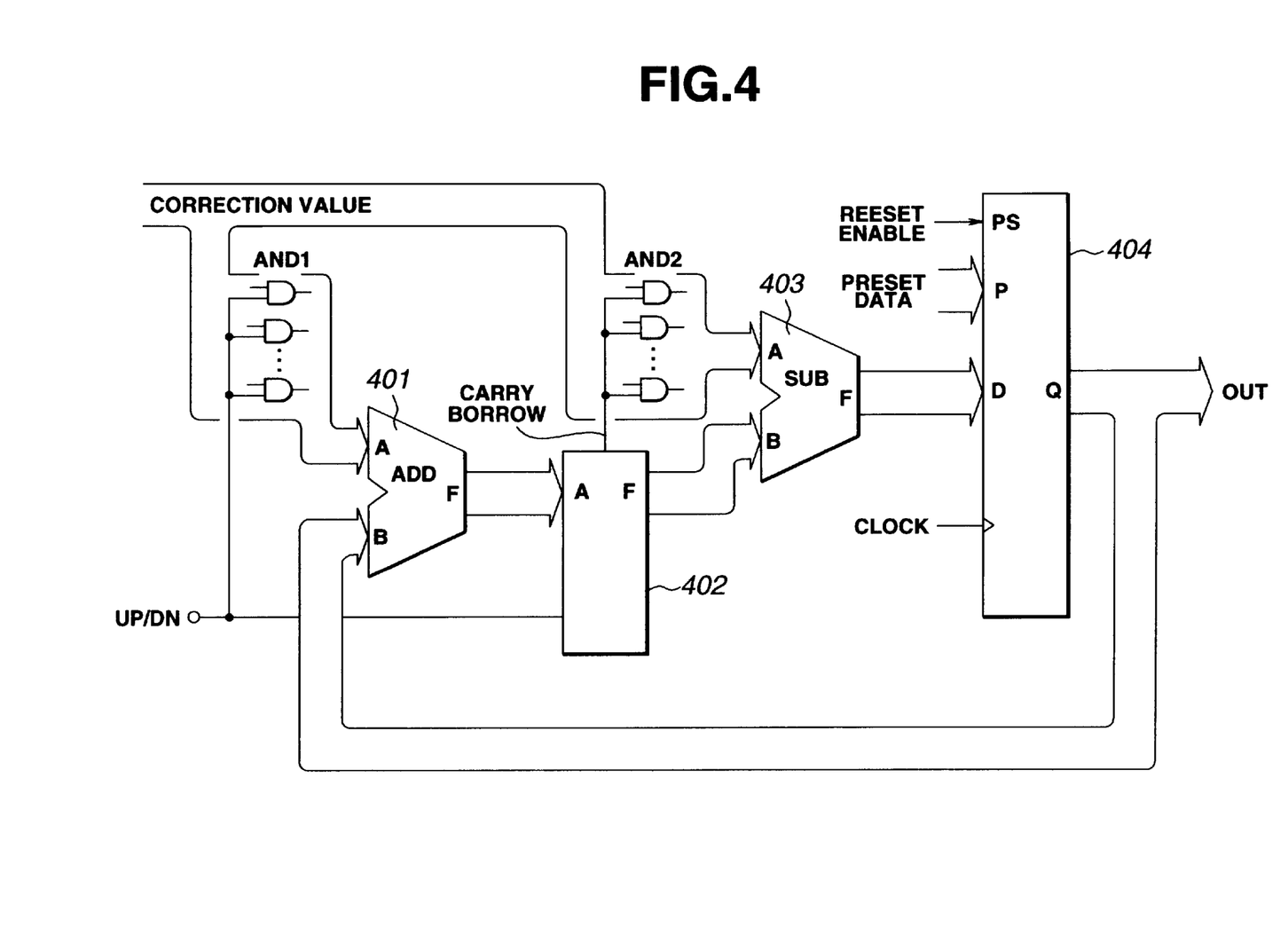
FIG. 4 is a circuit block diagram showing a construction of a N-number shift counter according to the present invention.

As shown in FIG. 4, the output of the adder 401 is supplied to an input of an up/down counter 402. The adder 401 is provided so as to add the correction value to an output of a counter 404. The output of the up/down counter 402 is supplied to a subtracter 403 wherein the correction value is subtracted from the output of the up/down counter 402 which is inputted to the other input of the subtracter 403. The output of the subtracter 403 is sent to the counter 404. The sent output is outputted as the count value of the output of the counter 404 and is returned to the adder 401. The up/down command value is applied to the up/down counter 402 and to one of input ports of the gate circuit AND1. The carry borrow output signal of the up/down counter 402 is applied to one of input ports of AND2. The counter 404 receives a preset enable signal, preset data and the clock.

Figure 5A:
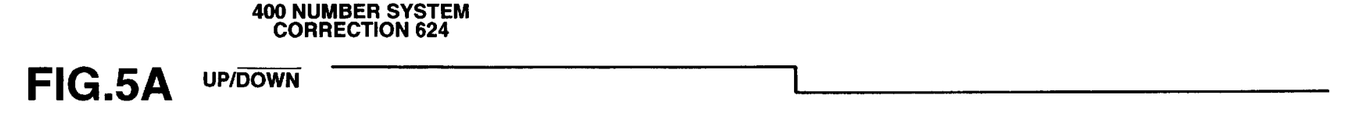
FIGS. 5A to 5H are time charts for explaining the operation of the apparatus shown in FIG. 4.
Figure 5B:
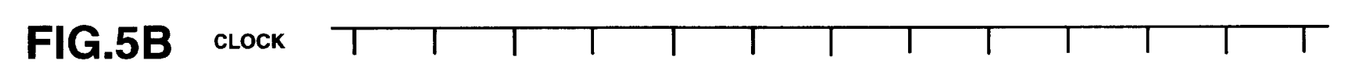
Figure 5C:
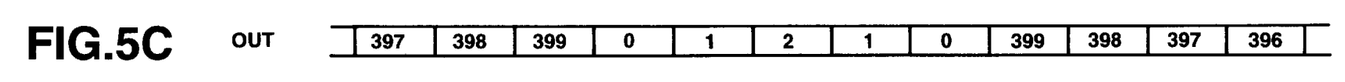
Figure 5D:
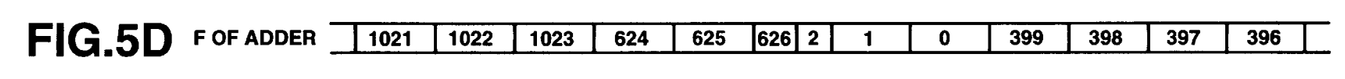
Figure 5E:
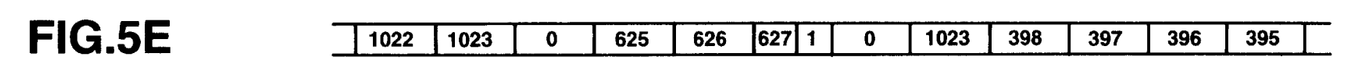

The manner of operation of the counter 404 will be discussed with reference to FIG. 5, hereinafter. Herein, assuming an up/down counter of 400 number system upon using a counter of 1024 number system type, a correction number of this counter becomes 624. In case that the output of the counter 404 is 397 as shown in FIG. 5C and that the up/down command signal is H (high level) as shown in FIG. 5A, a correction value passed through the gate circuit AND1 is inputted to an input port A of the adder 401. Therefore, the adder 401 outputs a value 1021 obtained by adding the correction number 624 to the input valve 397 from the counter 404.

Figure 5F:
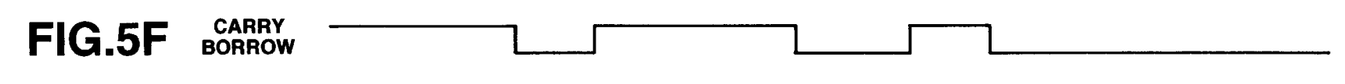
Figure 5G:
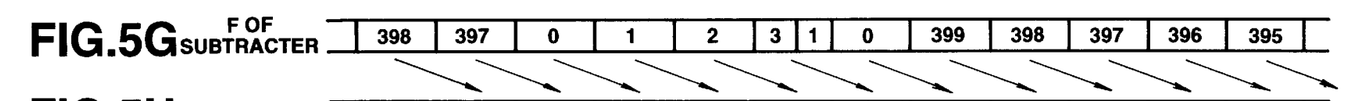
Figure 5H:
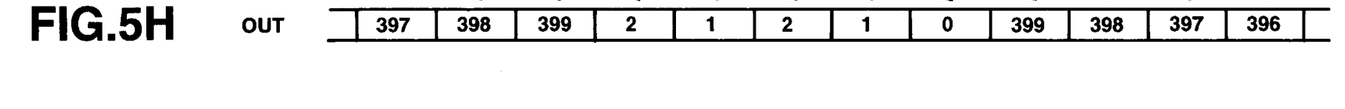

The counter 404 increments the value 1021 by 1 and obtains a value 1022. Since the carry borrow signal of the counter 402 is H as shown in FIG. 5F, the correction value is inputted to the subtracter 403 through the gate circuit AND2, the subtracter 403 outputs 398 obtained by subtracting the correction value 624 from the value 1022.

The output of the counter 404 becomes 398 and the output is applied to an input port B of the adder 401. Thereafter, when a similar operation is repeated and the count value of the counter 402 returned to 0 following to the 1023, the count value of the counter 404 changes from 399 to 0. Therefore, the output of the adder 401 becomes 624 and the count value of the counter 402 is then increased from 625 to 1023 one by one. The count value of the counter 404 is increased from 1 one by one. When the up/down command signal is changed to L (low level), the supply of the correction value to the input port A of the adder 401 is stopped, and the output of the adder 401 becomes the same as the output of the counter 404. The same value is inputted to the counter 402. Since the counter 402 outputs a value obtained by decrementing the input value by 1 and the subtracter 403 does not execute the subtraction of the correction value, the count value as same as the count value of the counter 402 is inputted to the counter 404.

Since the counter 402 is arranged such that the count value is changed from 0 to 1023 by the increment by 1, the carry borrow signal is outputted at this time. Therefore, the subtracter 402 subtracts the correction value 624 from 1023 and outputs 399 to the counter 404. From this time, when the up/down command signal is L, the adding and subtracting of the correction value does not executed. Accordingly, the counters 402 and 404 output the same count value such as 398, 397, 396, - - - .

As mentioned above, in order to obtain N number system counter upon using binary counters of n-bits, a value (M−N) obtained by subtracting a number N from the maximum number (radix) $M=2^n$ of n-bits binary counter may be used as the correction value of the counter. Therefore, it is possible to obtain a desired number system counter only by determining the radix (base) N of the number system.

As is clear from the above explanation, the count value of the up/down counter 110 counts up or down the displacement at each cycle of the phase modulation signal, so as to preset the ABS of the previous one cycle ($\lambda$) in the next cycle. Therefore, even when the displacement sensor is stopped or when the electric source of the system is turned on, the ABS within $\lambda$ is always obtained.

The output of the counter is a binary form and the continuous 2-bits are treated as incremental displacement information. By comparing the remained upper bits or all bits with the set value, the result is treated as a fixed point (origin point) information within one cycle ($\lambda$).

Particularly, by obtaining the exclusive-OR between the upper first and second bits of the continuous 2 bits, the conversion of the 2 bits to the 2 bit Glay code (A/B phase) is obtained. Therefore, by comparing the remaining upper bits, the origin point synchronous with the A/B phase is obtained. The positional relation between the A/B phase and the origin point is only absolute positional relation in the cycle $\lambda$, and the origin point is not shifted from the phases of A-phase and B-phase. This enables the high accuracy to be ensured by this apparatus.

With the thus arranged apparatus according to the present invention, the following advantages are ensured.

(1) Since the position of the fixed point (origin point) is properly selected within a scale $\lambda$ regardless the fixed point accuracy, the system ensures the high accuracy in measurement.

(2) Since the ABS within the scale ($\lambda$) is obtained at the turning ON of the electric source, it becomes possible to obtain a synchronous origin point.

(3) Since all circuits are constituted by logic circuits, it is easy to produce this system into IC package and small.

The entire disclosures of Japanese Patent Application No. 8-233458 filed on Sep. 3, 1996 including specification, claims, drawings and summary are incorporated herein by reference in its entirety.

What is claimed is:

1. A displacement detecting apparatus for interpolating a phase modulation signal whose phase difference with a reference signal represents a displacement and for outputting the interpolated phase modulation signal, the displacement detecting apparatus comprising:
   a direction obtaining means for obtaining a direction signal indicative whether a cycle of the phase modulation signal is longer than a cycle of the reference signal, said obtaining means obtaining a cycle difference between the cycle of the phase modulation signal and the cycle of the reference signal which is the same as that of the phase modulation signal under zero-displacement condition, said direction obtaining means obtaining the number of pulses of an interpolation clock which number corresponds to the cycle difference;
   a phase difference obtaining means for obtaining a phase difference between the phase modulation signal and the reference signal, said phase difference obtaining means obtaining the number of pulses of the interpolation clock which number corresponds to the phase difference;
   a pulse train generating means for generating a pulse train constituted by pulses whose number is as same as the number of pulses of the interpolation clock indicative of the phase difference;
   an up/down counter receiving the pulse train from said pulse train generating means and the direction signal from said direction obtaining means and counting to an interpolation number;
   a presetting means for presetting the number of pulses obtained by said phase difference obtaining means in said up/down counter; and
   a displacement information outputting means for outputting a Glay code converted from continuous 2 bits of the count value of said up/down counter as displacement information.

2. A displacement detecting apparatus as claimed in claim 1, further comprising an origin information obtaining means for obtaining fixed point information by comparing the count value of said up/down counter with a set fixed point and for obtaining origin point information by executing AND operation between the fixed point information and the displacement information.

3. A displacement detecting apparatus as claimed in claim 1, further comprising a setting device for setting a set value and a fixed point information outputting means which obtains a correspond signal between the set value and all bits of said up/down counter, said fixed point information outputting means outputting a logical AND between the fixed point signal and the correspond signal as a fixed point information.

4. A displacement detecting apparatus as claimed in claim 1, wherein said up/down counter is of a 8-bit binary type.

5. A displacement detecting apparatus as claimed in claim 1, wherein said cycle difference obtaining means and said direction obtaining means include a circuit constituted by a subtracter, a setting device connected to the subtracter, a register connected to the subtracter, an up counter connected to the register and a differentiating circuit which differentiates the phase modulation signal and is connected to the up counter and to the register through a reverse circuit.

6. A displacement detecting apparatus as claimed in claim 1, wherein said phase difference obtaining means includes a circuit constituted by a reference signal differentiating circuit, an up counter connected to the reference signal differentiating circuit and an interpolation clock, and a register connected to the up counter and a phase modulation signal differentiating circuit through a reverse circuit.

7. A displacement detecting apparatus as claimed in claim 1, wherein said up/down counter includes a circuit having an adder, an up/down counter, a subtracter and an up counter.

8. A displacement detecting apparatus, that interpolates a phase modulation signal whose phase difference with a reference signal represents a displacement, and that outputs the interpolated modulation signal, the displacement detecting apparatus comprising:
   a direction obtaining unit that obtains a direction signal, which indicates whether a cycle of the phase modulation signal is longer than a cycle of the reference signal, that obtains a cycle difference between the cycle of the phase modulation signal and the cycle of the reference signal, which is the same as that of the phase modulation signal under a zero-displacement condition, and that obtains the number of pulses of an interpolation clock, which number corresponds to the cycle difference;
   a phase difference obtaining unit that obtains a phase difference between the phase modulation signal and the reference signal and that obtains the number of pulses of the interpolation clock, which number corresponds to the phase difference;
   a pulse train generator that generates a pulse train constituted by pulses whose number is the same as a number of pulses of the interpolation clock indicative of the phase difference;
   an up/down counter that receives the pulse train from said pulse train generator and the direction signal from said direction obtaining unit, and counts to an interpolation number;
   a presetting unit that presets the number of pulses obtained by said phase difference obtaining unit into said up/down counter; and
   a displacement information outputting unit that outputs as displacement information a Glay code converted from a continuous 2 bits of the count value of said up/down counter.

9. A displacement detecting apparatus as claimed in claim 1, further comprising an origin information obtaining unit that obtains fixed point information by comparing the count value of said up/down counter with a set fixed point and that obtains origin point information by executing an AND operation between the fixed point and the displacement information.

10. A displacement detecting apparatus as claimed in claim 1, further comprising:
   a setting device that sets a set value; and
   a fixed point information outputting unit that obtains a correspond signal between the set value and all bits of the up/down counter, and that outputs a logical AND between the fixed point signal and the correspond signal as fixed point information.

11. A displacement detecting apparatus as claimed in claim 1, wherein said up/down counter is of a 8-bit binary type.

12. A displacement detecting apparatus as claimed in claim 1, wherein said cycle difference obtaining unit and said direction obtaining unit include a circuit having:
   a subtracter,
   a setting device connected to the subtracter,
   a register connected to the subtracter,
   an up counter connected to the register, and a differentiating circuit connected to the up counter and the register through a reverse circuit and that differentiates the phase modulation signal.

13. A displacement detecting apparatus as claimed in claim 1, wherein said phase difference obtaining unit includes a circuit having:

a reference signal differentiating circuit, an up counter connected to the reference signal differentiating circuit and an interpolation clock, and a register connected to the up counter and a phase modulation signal differentiating circuit through a reverse circuit.

14. A displacement detecting apparatus as claimed in claim 1, wherein said up/down counter includes a circuit having an adder, an up/down counter, a subtracter, and an up counter.

* * * * *